United States Patent
Tilton et al.

(10) Patent No.: US 7,166,547 B2
(45) Date of Patent: Jan. 23, 2007

(54) UNDER CARPET HEAT SHIELD AND FLOOR PAN INSULATOR

(75) Inventors: Jeffrey A. Tilton, Goshen, KY (US); Bharat D. Patel, Pickerington, OH (US); Thomas T. Block, Howell, MI (US); Larry E. Targett, Pickerington, OH (US)

(73) Assignee: Owens Corning Fiberglas Technology, Inc., Summit, IL (US)

( * ) Notice: Subject to any disclaimer, the term of this patent is extended or adjusted under 35 U.S.C. 154(b) by 190 days.

(21) Appl. No.: 10/160,076

(22) Filed: May 31, 2002

(65) Prior Publication Data

US 2003/0003835 A1 Jan. 2, 2003
US 2004/0242109 A9 Dec. 2, 2004

Related U.S. Application Data

(63) Continuation-in-part of application No. 09/607,478, filed on Jun. 30, 2000, now Pat. No. 6,572,723.

(60) Provisional application No. 60/295,432, filed on Jun. 1, 2001.

(51) Int. Cl.
*B32B 5/26* (2006.01)
*B32B 7/02* (2006.01)
*B32B 15/14* (2006.01)

(52) U.S. Cl. ............ 442/389; 442/376; 442/378; 442/381; 442/390; 442/414; 442/415; 442/416; 428/218

(58) Field of Classification Search .......... 442/378, 442/392, 409, 414, 415, 416; 181/284, 290, 181/291, 294
See application file for complete search history.

(56) References Cited

U.S. PATENT DOCUMENTS

| | | | | |
|---|---|---|---|---|
| 4,888,235 A | * | 12/1989 | Chenoweth et al. | 442/342 |
| 5,233,021 A | * | 8/1993 | Sikorski | 528/491 |
| 5,272,000 A | * | 12/1993 | Chenoweth et al. | 442/35 |
| 5,456,872 A | * | 10/1995 | Ahrweiler | 264/115 |
| 5,470,424 A | * | 11/1995 | Isaac et al. | 156/253 |
| 5,516,580 A | * | 5/1996 | Frenette et al. | 442/153 |
| 5,719,198 A | * | 2/1998 | Young et al. | 521/40.5 |
| 5,767,024 A | * | 6/1998 | Anderson et al. | 442/378 |
| 6,123,172 A | | 9/2000 | Byrd et al. | |
| 6,217,691 B1 | * | 4/2001 | Vair et al. | 156/176 |
| 6,572,723 B1 | | 6/2003 | Tilton et al. | |
| 6,599,850 B1 | * | 7/2003 | Heifetz | 442/376 |
| 2003/0008592 A1 | | 1/2003 | Block et al. | |

FOREIGN PATENT DOCUMENTS

JP 10 228285 11/1998
JP 11 034760 5/1999

* cited by examiner

*Primary Examiner*—Jenna Befumo
(74) *Attorney, Agent, or Firm*—Inger H. Eckert; Margaret S. Millikin; Maria C. Gasaway

(57) ABSTRACT

An under carpet heat shield/floor pan insulator is provided for a vehicle. The shield/insulator includes an acoustical and thermal insulating layer of polymer fiber that shows no signs of any thickness increase, delamination, deterioration or any undesirable effect which may affect performance for at least 330 hours when maintained at a temperature of at least approximately 150° C. The shield/insulator may include a relatively high density, nonlaminate skin of polymer fiber and/or one or more facing layers constructed from polymer material.

2 Claims, 2 Drawing Sheets

UNDER CARPET HEAT SHIELD AND FLOOR PAN INSULATOR

This application is a continuation-in-part of U.S. patent application Ser. No. 09/607,478 file Jun. 30, 2000 now U.S. Pat. No. 6,572,723.

TECHNICAL FIELD AND INDUSTRIAL APPLICABILITY OF THE INVENTION

The present invention relates generally to the field of acoustical and thermal insulation and, more particularly, to an under carpet shield and floor pan insulator for a vehicle.

BACKGROUND OF THE INVENTION

Acoustical and thermal insulators and liners for application to vehicles are well known in the art. These insulators typically rely upon both sound absorption, i.e. the ability to absorb incident sound waves and transmission loss, i.e. the ability to reflect incident sound waves, in order to provide sound attenuation. They also rely upon thermal shielding properties to prevent or reduce the transmission of heat from various heat sources (e.g. engine, transmission and exhaust system), to the passenger compartment of the vehicle. Such insulation is commonly employed as an under carpet heat shield and a floor pan insulator.

Examples of acoustical and thermal insulation in the form of liners are disclosed in a number of prior art patents including U.S. Pat. No. 4,851,283 to Holtrop et al. and U.S. Pat. No. 6,008,149 to Copperwheat. As should be apparent from a review of these two patents, engineers have generally found it necessary to construct such liners from a laminate incorporating (a) one or more layers to provide the desired acoustical and thermal insulating properties and (b) one or more additional layers to provide some rigidity to allow ease of handling during installation.

U.S. Pat. No. 6,092,622 to Hiers et al. and U.S. Pat. No. 6,123,172 to Byrd et al. disclose needled composite thermal and acoustical insulators containing various layers of polymer fibers, glass fibers, metallic foils, scrims and other facings. The metallic foil facing is secured in place with an adhesive. The needling construction of the batt requires perforating the interior insulating layer, thereby providing numerous passageways for the passage of both heat and sound.

While a number of adhesives, adhesive webs and binding fibers have been specifically developed over the years to secure the various layers of the laminates together, laminated shields and insulators have an inherent risk of delamination and failure. The potential is, in fact, significant mainly due to the harsh operating environment to which the shields and insulators are subjected. Many shields and insulators are located near and/or are designed to shield high heat sources such as the engine, transmission and exhaust system. As a result, the shields and insulators are often subjected to temperatures in excess of 200° F. which have a tendency to degrade the adhesives and binders over time.

Shields and insulators used for under carpet and floor pan applications also carry foot traffic and thus are subjected to repeated compression and decompression. This activity places very significant strain on the shields and insulators, often resulting in adhesive failure and delamination of the shield or insulator over time.

A need is therefore identified for an under carpet heat shield/floor pan insulator incorporating a nonlaminate acoustical and thermal insulating layer of polymer fibers suitable for use in the proximity of high temperature heat sources such as an exhaust system and particularly a catalytic converter and capable of providing the desired acoustical and thermal insulating properties. Advantageously, such an insulator also provides the desired mechanical strength and rigidity to allow simple and convenient installation while also providing a long service life characterized by reliable performance.

SUMMARY OF THE INVENTION

Accordingly, it is a primary object of the present invention to provide an under carpet heat shield/floor pan insulator for a vehicle. That shield/insulator comprises a single, nonlaminate acoustical and thermal insulating layer of polymer fiber selected from a group consisting of polyester, polypropylene, polyethylene, rayon, nylon and any mixtures thereof. The thermal insulating layer is preferably a nonwoven fabric and may further include additional fibers selected from a group consisting of glass fibers and natural fibers to meet the specific performance requirements of a particular application.

In accordance with one aspect of the present invention the acoustical and thermal insulating layer may include a relatively high density, nonlaminate skin of polymer fiber along at least one face thereof. Still further, the insulator may include a first metal foil facing layer over a first face of the acoustical and thermal insulating layer. Similarly, a second metal foil facing layer may be provided over a second face of the acoustical and thermal insulating layer.

More specifically describing the invention, the under carpet heat shield and floor pan insulator of the present invention may comprise a single nonlaminate acoustical and thermal insulating layer of polymer fiber selected from a group consisting of polyester, polypropylene, polyethylene, rayon, nylon and any mixtures thereof that shows no signs of any thickness increase, delamination, deterioration or any undesirable effect which may affect performance when subjected to a temperature of about 150° C. for a period of at least 330 hours. Still more specifically describing the invention, the shield/insulator may comprise a nonlaminate acoustical and thermal insulating layer of substantially 100% polyethylene terephthalate.

The benefits and advantages of the present invention will become readily apparent to those skilled in this art from the following description wherein there is shown and described several preferred embodiments of this invention, simply by way of illustration of some of the modes best suited to carry out the invention. As it will be realized, the invention is capable of still other different embodiments and its several details are capable of modification in various, obvious aspects all without departing from the invention. Accordingly, the drawing and descriptions will be regarded as illustrative in nature and not as restrictive.

BRIEF DESCRIPTION OF THE DRAWING

The accompanying drawing incorporated in and forming a part of the specification, illustrates several aspects of the present invention, and together with the description serves to explain the principles of the invention. In the drawing.

DETAILED DESCRIPTION OF THE INVENTION

Figure 1:
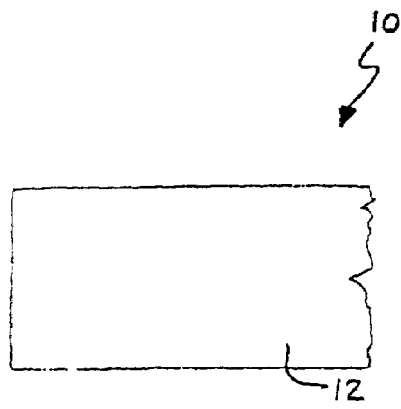
FIG. 1 is a schematical side elevational view of one possible embodiment of the present invention.

Reference is now made to FIG. 1 showing a first embodiment of the under carpet heat shield and floor pan insulator 10 of the present invention. The shield or insulator 10 comprises an acoustical and thermal insulating layer 12 of polymer fiber. More specifically, a single, nonlaminated layer 12 is provided with the necessary mechanical strength and rigidity to allow easy installation and the desired acoustical and thermal insulating properties. Advantageously, all of these benefits are achieved in a light weight insulator 10 which may even be used in compact vehicles where fuel economy concerns lead manufacturers to seek weight savings wherever possible.

The polymer fiber is not foamed and typically is a nonwoven fabric. The polymer fiber may be selected from a group of fibers consisting of polyester, polypropylene, polyethylene, rayon, nylon and any mixtures thereof. The acoustical and thermal insulating layer 12 is engineered to show no signs of any thickness increase, delamination, deterioration or any undesirable effect which may affect performance when subjected to a temperature of approximately 150° C. for a period of at least 330 hours. Advantageously, such a shield or insulator 10 has a weight of between about 40–130 g/ft². For example, the acoustical and thermal insulating layer 12 may comprise substantially 100% polyethylene terephthalate.

A shield or insulator 10 made from 100% polyethylene terephthalate provides a number of advantages when compared to a state of the art shield made from a layer of glass fibers sandwiched between layers of polyester. The shield or insulator 10 of the present invention may be cut with a heat knife to give an edge. The shield or insulator 10 of the present invention can be premolded to accommodate different shapes and sizes and will eventually mold to the cavity size even when the cavity is uneven. The state of the art shield cannot shape adapt to the mounting cavity in the bodywork or framework of the vehicle in a like manner.

Further, where the shield or insulator 10 of the present invention is dimensionally stable upon exposure to temperatures up to 450° F. at which slight yellowing may occur, the state of the art shield tends to disfigure and the phenolic binder is released, resulting in the production of an odor and browning of the shield. Of course, the shield or insulator 10 of the present invention is also free of glass fiber and, therefore, is installer friendly (does not produce an itchy feeling for those contacting the material). While the glass fiber in the state of the art product is sandwiched between two layers of polyester, the product still tends to be more irritating to those coming into contact with it. Accordingly, for many applications it is necessary to coat the edge of the shield or insulator in order to avoid this potential irritation.

Figure 2:
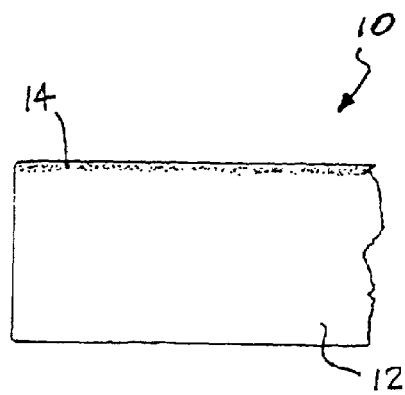
FIGS. 2–5 are schematical side elevational illustrations of other possible alternative embodiments of the present invention.

In a first alternative embodiment shown in FIG. 2, the shield or insulator 10 also comprises a nonlaminate acoustical and thermal insulating layer 12 of polymer fiber (e.g. a nonwoven fabric) selected from a group consisting of polyester, polypropylene, polyethylene, rayon, nylon and any mixtures thereof. The layer 12 also includes a relatively high density, nonlaminate or unitary skin 14 of that polymer fiber along at least one face thereof. The formation of the relatively high density, nonlaminate skin 14 of polymer fiber may be completed in accordance with the process described in detail in co-pending U.S. patent application Ser. No. 09/607,478, entitled "Process For Forming A Multi-Layer, Multi-Density Composite Insulator", filed Jun. 30, 2000 (Owens Corning Case Nos. 24811 and 24812). The full disclosure of this document is incorporated herein by reference.

Advantageously, the high density skin 14 will not delaminate from the layer 12 under the environmental conditions existing under the carpet and along the floor pan of the vehicle and also adds structural integrity and strength to the shield or insulator 10 which aids significantly in handling and fitting the part during installation. The high density skin 14 is also more aesthetically pleasing. Still further, for many applications the high density skin 14 eliminates the need to provide an additional facing layer of another type of material. This serves to eliminate any potential failure of the shield or insulator due to delamination. It also results in a shield or insulator made exclusively from one material that is, therefore, readily recyclable. Further, since the skin may be formed with a hot platen during the molding of the shield or insulator 10 to its desired shape, no additional processing step is required. This reduces production cost relative to a shield or insulator with a facing since such a facing must be adhered to the acoustical and thermal insulating layer in a separate processing step.

Figure 3:
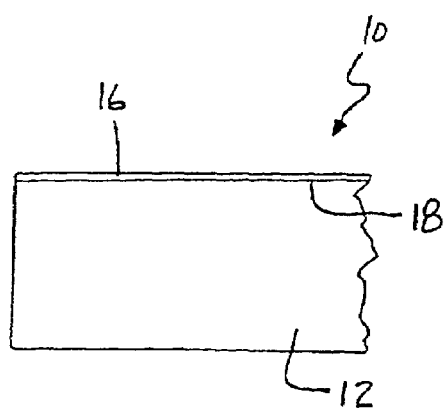

In yet another embodiment shown in FIG. 3, the shield or insulator 10 includes a nonlaminate acoustical and thermal insulating layer of polymer fiber 12 (e.g. a nonwoven fabric) selected from a group consisting of polyester, polypropylene, polyethylene, rayon, nylon and any mixtures thereof in combination with a metal foil facing layer 16 over a first face 18 of the acoustical and thermal insulating layer. The metal foil facing may be present in one or more layers.

Figure 4:
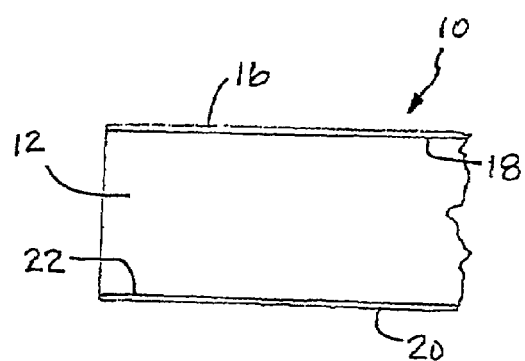

In yet another alternative embodiment shown in FIG. 4, the shield or insulator 10 comprises a nonlaminate acoustical and thermal insulating layer 12 of polymer fiber as described above in combination with a first metal foil facing layer 16 covering a first face 18 thereof and a second metal foil facing layer 20 covering a second, opposite face 22 thereof. The second facing layer 20 may be constructed from the same or a different material as the first facing layer 16. The first and second facing layers 16, 20 may be attached to the layer 12 by means of an appropriate adhesive or adhesive web in accordance with practices well known to those skilled in the art.

Figure 5:
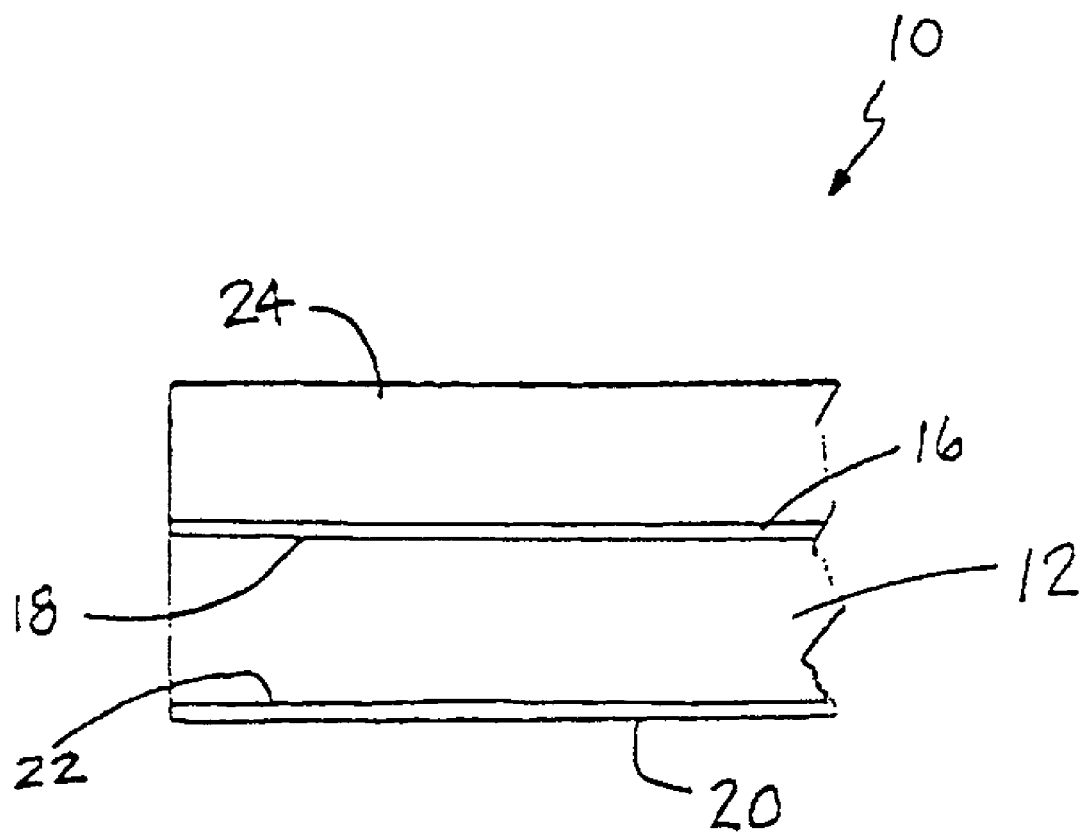

In accordance with yet another embodiment of the present invention shown in FIG. 5, the shield or insulator 10 comprises a single, nonlaminated acoustical and thermal insulating layer 12 of polymer fiber (e.g. a nonwoven fabric) as described above in combination with a first metal foil facing 16 covering a first face thereof and a second metal foil facing 20 covering a second face 22 thereof. Additionally, the shield or insulator 10 of this embodiment includes an additional acoustical and thermal insulating layer 24 of polymer fiber (e.g. a nonwoven fabric) selected from a group consisting of polyester, polypropylene, polyethylene, rayon, nylon and any mixtures thereof. As a result, the first metal foil facing layer 16 is sandwiched between the two acoustical and thermal insulating layers 12, 24.

In any of the embodiments described above and illustrated in FIGS. 1–5, the acoustical and thermal insulating layer 12 and or 24 may further include from about 10–60 weight percent of glass and/or natural fibers such as, but not limited to E-glass, S-glass, kenaf, hemp and mixtures thereof. Use of such glass and natural fibers may be desirable to meet the performance parameters necessary for some potential applications.

In summary, numerous benefits result from employing the concepts of the present invention. An under carpet heat shield or floor pan insulator 10 constructed in accordance with the teachings of the present invention provides a unique combination of mechanical strength and rigidity as well as thermal and acoustical properties which are consistently and reliably maintained over a long service life even in the proximity of a high temperature heat source such as a catalytic converter. In one of the embodiments of the present invention, a relatively high density, nonlaminate skin is provided which aids in handling, is aesthetically pleasing and maintains the full recycleability of the shield or insulator.

The foregoing description of a preferred embodiment of the invention has been presented for purposes of illustration and description. It is not intended to be exhaustive or to limit the invention to the precise form disclosed. Obvious modifications or variations are possible in light of the above teachings. For example, the shield or insulator 10 could include a relatively high density nonlaminate skin 14 on both opposing faces and/or along the edges of the shield or insulator. Additionally, a shield or insulator 10 with one or more high density, nonlaminate skins 14 could also include one or more facings 16, 20 if required to meet acoustical, thermal, structural and/or aesthetic performance requirements of a particular application.

The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

What is claimed is:

1. An under carpet heat shield/floor pan insulator for a vehicle, comprising:
    a nonlaminate multidensity acoustical and thermal insulating layer of polyester fiber, having a nonlaminate skin of polyester fiber along at least one face of said acoustical and thermal insulating layer, said nonlaminate skin having a higher density than a remaining portion of said insulating layer;
    a first metal foil facing layer over a first face of said acoustical and thermal insulating layer;
    a second metal foil facing layer over a second face of said acoustical and thermal insulating layer;
    an additional acoustical and thermal insulating layer of polymer fiber selected from a group consisting of polyester, polypropylene, polyethylene, rayon, nylon and any mixtures thereof over said first metal foil facing layer wherein said first metal foil facing layer is sandwiched between said additional acoustical and thermal insulating layer and said acoustical and thermal insulating layer; and wherein at least one layer of said nonlaminate multidensity acoustical and thermal insulating layer and said additional acoustical and thermal insulating layer includes between about 10 weight percent and about 60 weight percent additional fibers selected from a group consisting of glass fibers and natural fibers.

2. The shield/insulator of claim 1, wherein said acoustical and thermal insulating layer is a nonwoven fabric.

* * * * *